US009690451B1

(12) United States Patent
Shah

(10) Patent No.: US 9,690,451 B1
(45) Date of Patent: *Jun. 27, 2017

(54) DYNAMIC CHARACTER BIOGRAPHIES

(71) Applicant: Amazon Technologies, Inc., Seattle, WA (US)

(72) Inventor: Mehal Shah, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 267 days.

This patent is subject to a terminal disclaimer.

(21) Appl. No.: 14/682,460

(22) Filed: Apr. 9, 2015

Related U.S. Application Data

(63) Continuation of application No. 13/248,284, filed on Sep. 29, 2011, now Pat. No. 9,026,934.

(51) Int. Cl.
G06F 3/048 (2013.01)
G06F 3/0483 (2013.01)
G06F 15/02 (2006.01)

(52) U.S. Cl.
CPC ........ *G06F 3/0483* (2013.01); *G06F 15/0291* (2013.01)

(58) Field of Classification Search
CPC .......................... G06F 3/0483; G06F 15/0291
See application file for complete search history.

(56) References Cited

U.S. PATENT DOCUMENTS

| 6,320,591 | B1 * | 11/2001 | Griencewic | G06F 17/30014 345/582 |
| 7,877,460 | B1 * | 1/2011 | Brouwer | G06Q 10/10 709/205 |
| 2003/0035075 | A1 * | 2/2003 | Butler | H04N 7/163 348/734 |
| 2007/0083527 | A1 * | 4/2007 | Wadler | G06F 17/30852 |
| 2007/0157247 | A1 * | 7/2007 | Cordray | G06F 3/0481 725/47 |
| 2008/0301318 | A1 * | 12/2008 | McCue | G10L 25/78 709/231 |
| 2011/0191701 | A1 * | 8/2011 | Kim | G06F 9/4443 715/763 |
| 2011/0209057 | A1 * | 8/2011 | Hinckley | G06F 1/1641 715/702 |
| 2012/0036423 | A1 * | 2/2012 | Haynes, II | G06F 17/241 715/230 |
| 2012/0079372 | A1 * | 3/2012 | Kandekar | G06F 17/2745 715/256 |
| 2012/0210203 | A1 * | 8/2012 | Kandekar | G06F 17/30719 715/230 |

(Continued)

OTHER PUBLICATIONS

Anonymous. "Dragon Age Wiki Navigation," located at http://dragonage.wikia,com/wiki/Codex_%28Origins%29, last visited on Sep. 29, 2011, 4 pages.

*Primary Examiner* — Anil Bhargava
(74) *Attorney, Agent, or Firm* — Lowenstein Sandler LLP

(57) ABSTRACT

A dynamic biography module in a user device receives a request for supplemental information corresponding to an electronic media item being consumed by a user. The dynamic biography module determines the user's reading location in the electronic media item and determines a version of the supplemental information corresponding to the reading location. In response, the dynamic biography module provides the corresponding version of the supplemental information to the user.

20 Claims, 10 Drawing Sheets

(56) References Cited

U.S. PATENT DOCUMENTS

| | | | |
|---|---|---|---|
| 2012/0311438 A1* | 12/2012 | Cranfill | G06F 17/30011 715/256 |
| 2013/0124988 A1* | 5/2013 | Lettau | G06F 17/2264 715/277 |
| 2013/0170818 A1* | 7/2013 | Klappert | G06Q 50/01 386/299 |
| 2013/0227401 A1* | 8/2013 | Kandekar | G06F 17/30719 715/254 |

* cited by examiner

DYNAMIC CHARACTER BIOGRAPHIES

RELATED APPLICATIONS

This application is a continuation of U.S. patent application Ser. No. 13/248,284 filed Sep. 29, 2011, the entire contents of which are hereby incorporated by reference.

BACKGROUND OF THE INVENTION

A large and growing population of users enjoys entertainment through the consumption of media items, including electronic media, such as electronic books (also referred to herein as ebooks), electronic newspapers, electronic magazines, other electronic publications, audio books, and digital video. Users employ various electronic devices to consume such media items. Among these electronic devices are electronic book readers, cellular telephones, personal digital assistants (PDAs), portable media players, tablet computers, electronic pads, netbooks, desktop computers, notebook computers, and the like.

When a user is consuming an electronic media item, such as an ebook, that has a large number of characters or a complicated storyline, it may be difficult for the user to remember certain details (e.g., who a character is, which characters are affiliated with one another, what happened previously in the narrative). One way which a user may refresh his memory is by referring to a character biography, summary, abstract, etc., which is separate from the actual content of the electronic media item. Conventional character biographies or plot summaries, however, may contain spoilers. That is, they may include information about the character or plot that the user has not yet actually learned, as the information may be revealed at the end of the narrative. Thus, if the user refers to the character biography or summary before they have finished consuming the entire electronic media item, they may have certain details spoiled for them inadvertently.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION OF THE PRESENT INVENTION

Figure 1:
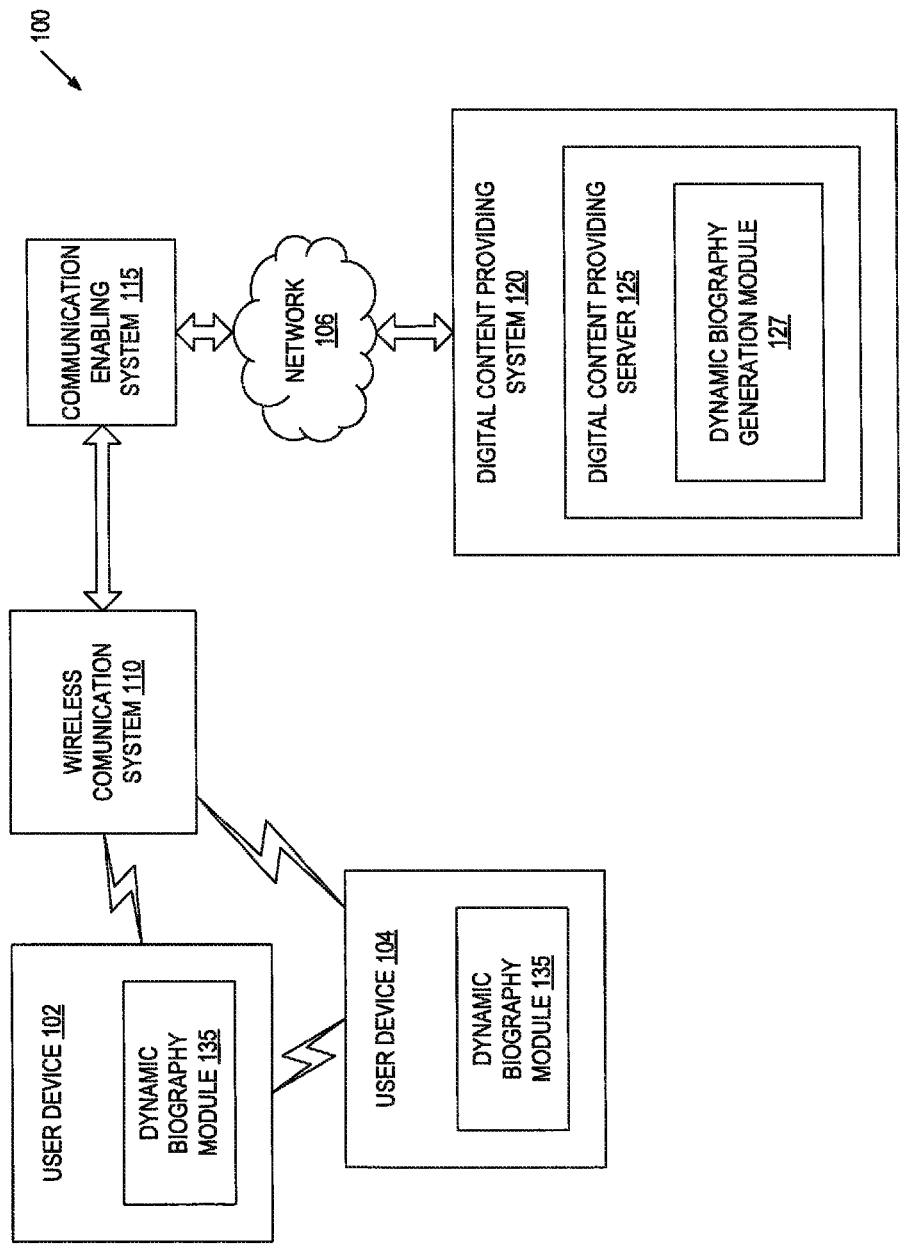
FIG. 1 is a block diagram of an exemplary network architecture, in which embodiments of the present invention may operate.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for providing dynamic character biographies. In one embodiment, a dynamic biography module in a user device receives a request for supplemental information corresponding to an electronic media item being consumed by a user. The request for supplemental information may be generated in response to a user input command. The dynamic biography module may determine the user's reading location in the electronic media item. Determining the user's reading location may include determining a number of measurable units of the electronic media item that the user has consumed. For an electronic publication this may include a number pages or chapters read, and for a digital audio or video file this may include a number of tracks, sections or a period of time that the user has listed to or viewed. The user's reading location may be determined by the user device on which the user is consuming the electronic media item.

The dynamic biography module may also determine a version of the supplemental information corresponding to the reading location. Determining the version of the supplemental information may include identifying, in a dynamic biography version mapping data, a version of the supplemental information associated with the number of measurable units that the user has consumed. Each version of the supplemental information may include details revealed in a narrative of the electronic media item up to a corresponding location in the electronic media item. The corresponding version of the supplemental information may be determined by the user device or by a digital content providing server.

In response, the dynamic biography module may provide the corresponding version of the supplemental information to the user. This may include displaying the supplemental information on a display of the user device or on a secondary device. The supplemental information may include, for example, a character biography for a character in the narrative of the electronic media item, a summary of the plot of the electronic media item, etc.

Dynamically providing the supplemental information to the user based on the current reading location prevents the user from being exposed to spoilers when viewing the supplemental information. Since only a version of the supplemental information corresponding to the reading location is provided to the user, the version includes only details that have been revealed in the narrative up to that point. In other words, the version of the supplemental information will only show details that the user should already know, but may have forgotten, and not any details that are not revealed until later on in the narrative. This provides a more enjoyable "spoiler-free" experience for the user.

FIG. 1 is a block diagram of an exemplary network architecture 100, in which embodiments of the present invention described herein may operate. The network architecture 100 may include a digital content providing system 120 and one or more user devices 102, 104 capable of communicating with the digital content providing system 120 via a network 106. Network 106 may include, for example, a public network such as the Internet or a private network such as a local area network (LAN).

The user devices 102, 104 may be portable computing devices such as electronic book readers or tablet computers (e.g., that include a book reader application). Other examples of portable computing devices include cellular telephones, personal digital assistants (PDAs), portable media players, netbooks, and the like. The user devices 102, 104 may also be non-portable computing devices such as a desktop computer, a set-top box associated with a television, a gaming console, and so on. The user devices 102, 104 are variously configured with different features to enable consumption of one or more types of digital content and electronic media items. The digital content and electronic media items may include electronic books (ebooks) such as electronic textbooks and/or other electronic publications (electronic versions of publications) such as electronic magazines, digital newspapers, digital audio books, electronic journals, real simple syndication (RSS) feeds, etc. The media items may also include digital video (e.g., movies, television, short clips, etc.), images (e.g., art, photographs, etc.), and multi-media content.

The digital content providing system 120 may correspond to any feature or combination of features for providing electronic media items or other digital content to the user devices 102, 104. The digital content providing system 120 may include a network-accessible server-based functionality (digital content providing server 125), various data stores (not shown), and/or other data processing equipment. The digital content providing system 120 may be implemented by a single machine or a cluster of machines. The digital content providing system 120 may include one or more machines (e.g., one or more server computer systems, routers, gateways, etc.) that have processing and storage capabilities to provide the server-based functionality.

In one embodiment, the digital content providing server 125 corresponds to an entity which provides electronic publications (e.g., electronic books) to users upon the users' purchase of the items. In this role, the digital content providing server 125 may essentially act as a bookseller or the like. In other cases, the digital content providing server 125 corresponds to an entity which provides electronic publications to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

The digital content providing server 125 may deliver, and the user devices 102, 104 receive, electronic publications (or other media items), search results, upgrades, and/or other information via the network 106. For example, the user devices 102, 104 may download or receive ebooks from the digital content providing server 125. The digital content providing server 125 may also receive various requests (e.g., search queries), instructions and other data from the user devices 102, 104 via the network 106.

Communication between the user devices 102, 104 and the item providing system 120 may be enabled via any communication infrastructure. One example of such an infrastructure includes a combination of a wide area network (WAN) and wireless infrastructure, which allows a user to use the user devices 102, 104 to purchase digital content (e.g., electronic publications) and consume the digital content without being tethered to the digital content providing system 120 via hardwired links. The wireless infrastructure may be provided by one or multiple wireless communications systems, such as wireless communication system 110. In one embodiment, wireless communication system 110 may be a wireless fidelity (WiFi) hotspot connected with the network 106. Wireless communication system 110 may also be a wireless carrier system that can be implemented using various data processing equipment, communication towers, etc. Alternatively, or in addition, the wireless carrier system may rely on satellite technology to exchange information with the user devices 102, 104.

The communication infrastructure may also include a communication-enabling system 115 that serves as an intermediary in passing information between the digital content providing system 120 and the wireless communication system 110. The communication-enabling system 115 may communicate with the wireless communication system 110 (e.g., a wireless carrier) via a dedicated channel, and may communicate with the digital content providing system 120 via a non-dedicated communication mechanism, (e.g., a public Wide Area Network (WAN) such as the Internet).

In addition to wirelessly connecting to wireless communication system 110, user devices 102, 104 may also wirelessly connect to other user devices 102, 104. For example, user device 102 may form a wireless ad hoc (peer-to-peer) network with user device 104 using WiFi, Bluetooth, or other wireless communication protocols.

In one embodiment, user devices 102, 104 each include a dynamic biography module 135. Dynamic biography module 135 may dynamically provide supplemental information to the user based on their current reading location in an associated electronic media item. The dynamic biography module 135 may receives a request for supplemental information corresponding to an electronic media item being consumed by a user. The dynamic biography module 135 may determine the user's reading location in the electronic media item and determine a version of the supplemental information corresponding to the reading location. In response, the dynamic biography module 135 may provide the corresponding version of the supplemental information to the user. Additional details of the dynamic biography module 135 are provided below.

In one embodiment, digital content providing server 125 includes dynamic biography generation module 127. Dynamic biography generation module 127 may generate the supplemental information as well as mapping data that identifies a location to which each version of the supplemental information corresponds. Upon request, dynamic biography generation module 127 may provide the supplemental information and mapping data to user device 102, 104. Additional details of the dynamic biography generation module 127 are provided below.

Figure 2:
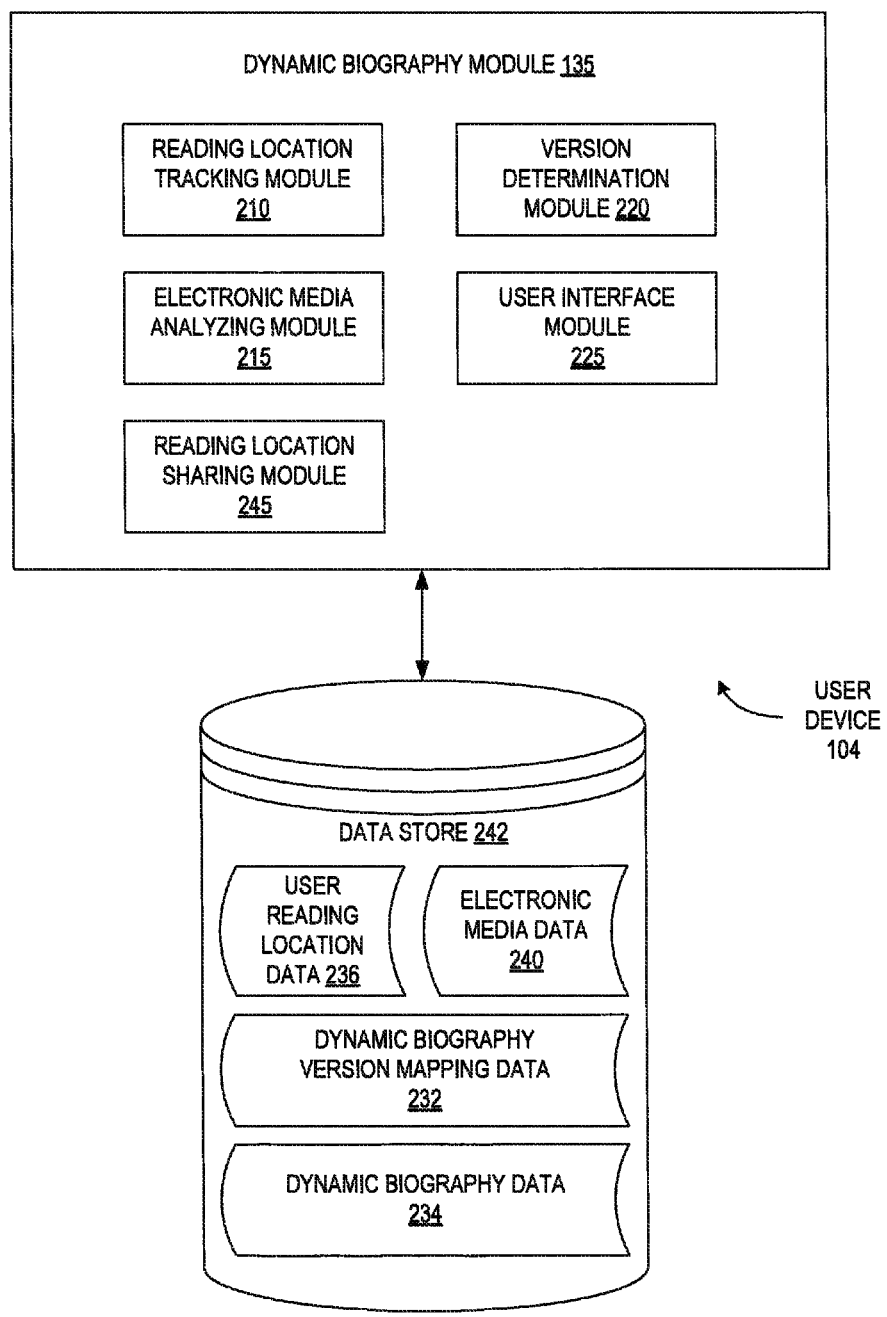
FIG. 2 is a block diagram illustrating a dynamic biography module, according to an embodiment.

FIG. 2 is a block diagram of one embodiment of a dynamic biography module 135 that is included in a user device 104, which may correspond to dynamic biography module 135 of FIG. 1. In one embodiment, user device 104 includes dynamic biography module 135, which may include reading location tracking module 210, electronic media analyzing module 215, version determination module 220, and user interface module 225. In other embodiments, consumption rate monitoring module 250 may also include reading location sharing module 245. In one embodiment, dynamic biography module 135 is connected to a data store 242, which may be a file system, database or other data management layer resident on a data storage device such as a disk drive, RAM, ROM, database, etc.

Reading location tracking module 210 tracks a user's reading location while the user reads (or otherwise consumes) an active electronic publication or other piece of electronic media (e.g., an ebook, audio book, digital video). For types of electronic media that are not read, reading location tracking module 210 may track other locations (e.g., listening location, viewing location, etc.). In general, these various types of locations may be referred to as a consumption location. Reading location tracking module 210 may record the user's reading location data 236 in data store 242.

In one embodiment, reading location tracking module 210 may determine a user's reading location by a portion of the media content that has been viewed (or otherwise consumed) by the user. The portion of the content which reading location tracking module measures may vary in different embodiments and may be configurable. Each portion may represent a measurable unit of the media content and may include, for example, characters, words, lines, sentences, paragraphs, pages, chapters, sections, books, images, frames, any other measurable unit, or any combination of these units. For example, reading location tracking module may track the number of pages of an electronic publication have been viewed by a user on user device 104, how many sections of an audio book or a digital video have been played by the user, or how long the audio book or digital video has been playing.

Electronic publications may have variable sized fonts, and the user device 104 can re-page material based on the amount of text that can fit on a single page using a selected font size. Additionally, the user device 104 may divide the text of electronic publications into pages based on contents of the text. For example, if a specific portion of the text deals with a particular topic, then that portion of the text may be included in a separate page than other adjacent text that deals with another topic. This may be the case even if there is space for text discussing both topics to be displayed on a single page at a current chosen font size. These or other variations may affect the portion of content being measured, and in turn affect the reading location measurement.

Electronic media analyzing module 215 may analyze the active electronic media publication to identify factors that may affect the portion of content being measured. For example, electronic media analyzing module 215 may examine the electronic publication to determine a number of words displayed on a screen at one time with the current font size. The font size may affect the number of pages (or screens) that make up the entire electronic publication. Electronic media analyzing module 215 may be configured to determine this directly from the electronic publication and store the information as electronic media data 240. In another embodiment, electronic media analyzing module 215 may obtain the information from electronic media data 240 in data store 242. Electronic media data 240 may be previously created by dynamic biography module 135 or may be created by some other application or program and may be updated when changes occur to the electronic publication, such as a change in font size as discussed above. In other embodiments, electronic media analyzing module 215 may determine other information or characteristics of the electronic publication, such as, a number of chapters or sections in the publication, the number of pages in the publication, the number of characters or words in a sentence, page, or paragraph, the number of frames in a video, or the like.

Version determination module 220 may analyze data from data store 242 to determine a corresponding version of the supplemental information. Version determination module 220 may read user reading location data 236 and electronic media data 240 from data store 242. In one embodiment, user reading location data 236 may include a number of pages or screens viewed by the user, or a number of sections or a length of time spent consuming the media content. In one embodiment, for example, user reading location data 236 may include a current page that a user is viewing on user device 104. In another embodiment, user reading location data 236 may include a value representing the last page read. This may include the highest numbered page that the user has viewed, which may be different from the current page in the event that the user turned back one or more pages. Electronic media data 240 may include characteristics of the electronic media item, at the time the user reading location data 236 was collected, such as a number of words displayed on each page or screen viewed by the user. Using reading location data 236 and electronic media data 240, version determination module 220 may determine an actual location in the media data that the user has reached. Using dynamic version mapping data 232 and the actual location, version determination module 220 may determine a corresponding version of the supplemental information. The supplemental information may be stored, for example, as dynamic biography data 234. Dynamic biography data 234 may include, for example, a number of different versions of a character biography, plot summary, etc. Each version may correspond to a location in the electronic media item. Different versions may have more, less, or different information depending on what has been revealed in the narrative up to the corresponding location.

In one embodiment, the information contained in each version of the supplemental information in dynamic biography data 234 may be classified as background information, as a spoiler, or as some other category. A spoiler may be a piece of information that reveals a major plot point or other detail that would be considered to "ruin" the story if revealed at an earlier time. In one embodiment, if a particular version includes a spoiler, dynamic biography module 135 make a determination whether or not to display the spoiler. For example, user interface module 225 may display a dialog box querying the user whether or not they want to reveal the spoiler. If the user provides an affirmative response, the corresponding version of the supplemental information, including the spoiler, may be displayed on the user device 104. In another embodiment, the version of the supplemental information corresponding to the reading location may be revealed automatically, without warning of the possible spoiler.

User interface module 225 may display the corresponding version of the supplemental information to a user, for example, on a display device of user device 104. In one embodiment, user interface module 225 may also receive a request for supplemental information and instruct version determination module to identify the appropriate version of the supplemental information. In another embodiment, user interface module 225 may also receive input from the user specifying a reading location and/or requesting that certain (or all) versions of the supplemental information be displayed.

In one embodiment, the user reading location data 236 may be calculated for one user and for the current piece of electronic media being consumed. In another embodiment, data store 242 may store user reading location data 236 and electronic media data 240 for multiple pieces of electronic media. This may include, for example, all of the books that the user has read in the past, other pieces of similar electronic media, or some other combination. In yet another embodiment, user reading location data 236 may be stored for multiple users on the same or different user devices. If multiple users share the same user device 104, there may be more than one user reading location data 236 for the same or different electronic media items. In one embodiment, reading location tracking module 210 may be able to reset or clear the user reading location data 236, for example, in response to a request from the user. The user may want to reset the reading location if they are rereading the book or if someone else had previously read the book and had user reading location data 236 stored. Dynamic biography module 135 may also include reading location sharing module 245 which enables the sharing of reading location data over a network, as described above with respect to FIG. 1. Thus, user reading location data 236 may be sent to or shared with another user device, computing device, server, etc. This may allow for version determination and/or for the user to view the supplemental information on some other device besides user device 104, such as a secondary device. For example, the supplemental information version determination may be made by digital content providing server 125, or the user may choose to view the supplemental information on his desktop computer, rather than on user device 104.

In one embodiment, the user device includes an optical sensor that tracks user eye movement. Reading location tracking module 210 may then correlate the user eye movement to currently displayed portions of text. This information may be used to more accurately identify a user's reading location. Thus, the optical sensor can be used to determine when a user has completed reading a portion of the electronic media rather than relying on a page turn signal.

Figure 3:
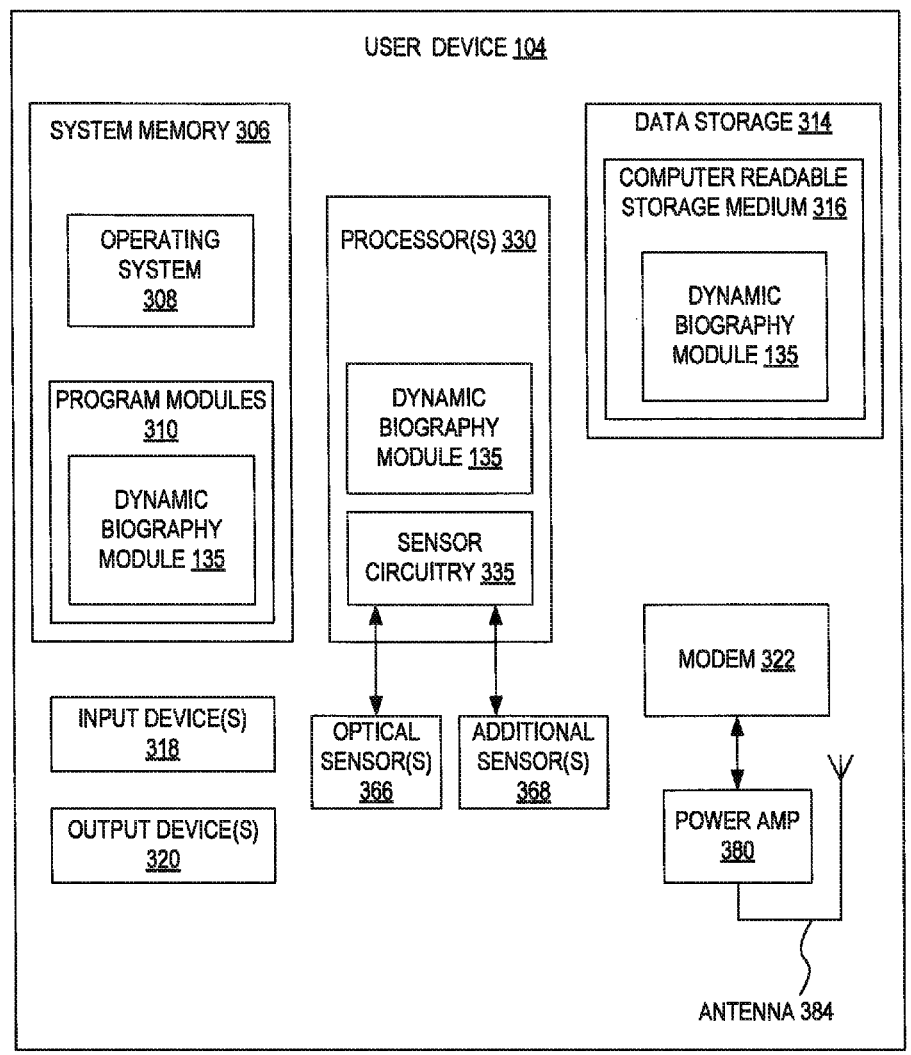
FIG. 3 is a block diagram illustrating an exemplary user device, according to an embodiment.

FIG. 3 is a block diagram illustrating an exemplary user device 104. In one embodiment, the user device 104 may correspond to one or all of the user devices 102, 104 of FIG. 1 and may be any type of user device such as an electronic book reader, a PDA, a mobile phone, a laptop computer, a portable media player, a tablet computer, an electronic pad, a desktop computer, a camera, a video camera, a netbook, and the like.

The user device 104 includes one or more processors 330, such as one or more CPUs, microcontrollers, field programmable gate arrays, or other types of processors. The user device 104 also includes system memory 306, which may correspond to any combination of volatile and/or non-volatile storage mechanisms. The system memory 306 stores information which provides an operating system component 308, various program modules 310 such as dynamic biography module 135, and/or other components. The user device 104 performs functions by using the processor(s) 330 to execute instructions provided by the system memory 306.

The user device 104 also includes a data storage device 314 that may be composed of one or more types of removable storage and/or one or more types of non-removable storage. The data storage device 314 includes a computer-readable storage medium 316 on which is stored one or more sets of instructions embodying any one or more of the methodologies or functions described herein. As shown, instructions for the dynamic biography module 135 may reside, completely or at least partially, within the computer readable storage medium 316, system memory 306 and/or within the processor(s) 330 during execution thereof by the user device 104, the system memory 306 and the processor(s) 330 also constituting computer-readable media. In one embodiment, data storage 314 includes data store 242 of FIG. 2. The user device 104 may also include one or more input devices 318 (keyboard, mouse device, specialized selection keys, etc.) and one or more output devices 320 (displays, printers, audio output mechanisms, etc.).

The user device 104 further includes a wireless modem 322 to allow the user device 104 to communicate via a wireless network (e.g., such as provided by the wireless communication system) and/or with other computing devices, such as remote computers, the item providing system, online book stores, electronic catalogs for libraries, and so forth. The wireless modem 322 may allow the user device 104 to handle both voice and non-voice communications (such as communications for text messages, multi-media messages, media downloads, web browsing, etc.) with the wireless communication system 110. The wireless modem 322 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiFi, etc. The wireless modem 322 may generate signals and send these signals to power amplifier (amp) 380 for amplification, after which they are wirelessly transmitted via antenna 384. In addition to sending data, antenna 384 also receives data, which is sent to wireless modem 322 and transferred to processor(s) 330.

In one embodiment, user device 104 includes an optical sensor 366. The optical sensor 366 may be a low resolution camera (e.g., having 0.2 or 0.3 Megapixels) that takes images (e.g., of a user's eyes) on a periodic basis. Alternatively, the optical sensor 366 may have a higher resolution, such as 1 Megapixel up to 10 or more Megapixels. The optical sensor 366 may be positioned such that images are taken of a user's face while the user holds the user device 104 in front of his face in a standard reading position. Therefore, the optical sensor 366 may be used to track user eye movement during reading.

In one embodiment, user device 104 includes one or more additional sensors 368 such as a physical contact sensor, close proximity sensors, or motion sensors. The sensors 368 can detect the presence of human body parts, and convey information regarding the detected presence to processor(s) 330. In one embodiment, the sensors 368 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 368 may also be optical (e.g., infrared) sensors that use an emitter and receiver pair to detect the presence of opaque objects. Alternatively, the sensors 368 may be inductive sensors, which include an inductive loop. When the presence of a human body part (or metal object) is brought close to the inductive sensor, an induction of the inductive loop changes, causing the human body part to be detected. Alternatively, the sensors 368 may be ultrasonic sensors that emit an ultrasonic signal and measure a time duration between when a signal is transmitted and the reflection of that signal received (a.k.a., flight response). The sensors 368 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used.

In one embodiment, the additional sensors 368 include a motion sensor, such as an accelerometer or one or more gyroscopes. The user device 104 may use motion data from motion sensors to determine whether a user is holding the user device 104. For example, if the user device 104 experiences constant minor accelerations, it may be determined that the user device 104 is being held in a user's hand. Additionally, if the user device 104 is at a particular angle (detectable based on acceleration readings from an accelerometer), it may be determined that the user device 104 is being rested on a user's leg during reading.

The processor(s) 330 may include sensor circuitry 335 (e.g., sensor device drivers) that enables the processor(s) 330 to interpret signals received from the optical sensor(s) 366 and/or additional sensors 368. In one embodiment, the optical sensors 366 and/or additional sensors 368 output raw sensor data. In another embodiment, the optical sensors 366 and/or additional sensors 368 output fully processed signals to the processor(s) 330. For example, the additional sensors 368 may output a user contact/no user contact signal using a single line interface or a multi-line interface. In another embodiment, the additional sensors 368 output, for example, positional data and/or object presence data (e.g., of a human body part) to the processors 330 without first processing the data. In either instance, the processors 330 may use the sensor circuitry 335 to process and/or interpret the received data. If data is received from multiple sensors, processing the data may include averaging the data, identifying a maximum from the data, or otherwise combining the data from the multiple sensors.

Figure 4:
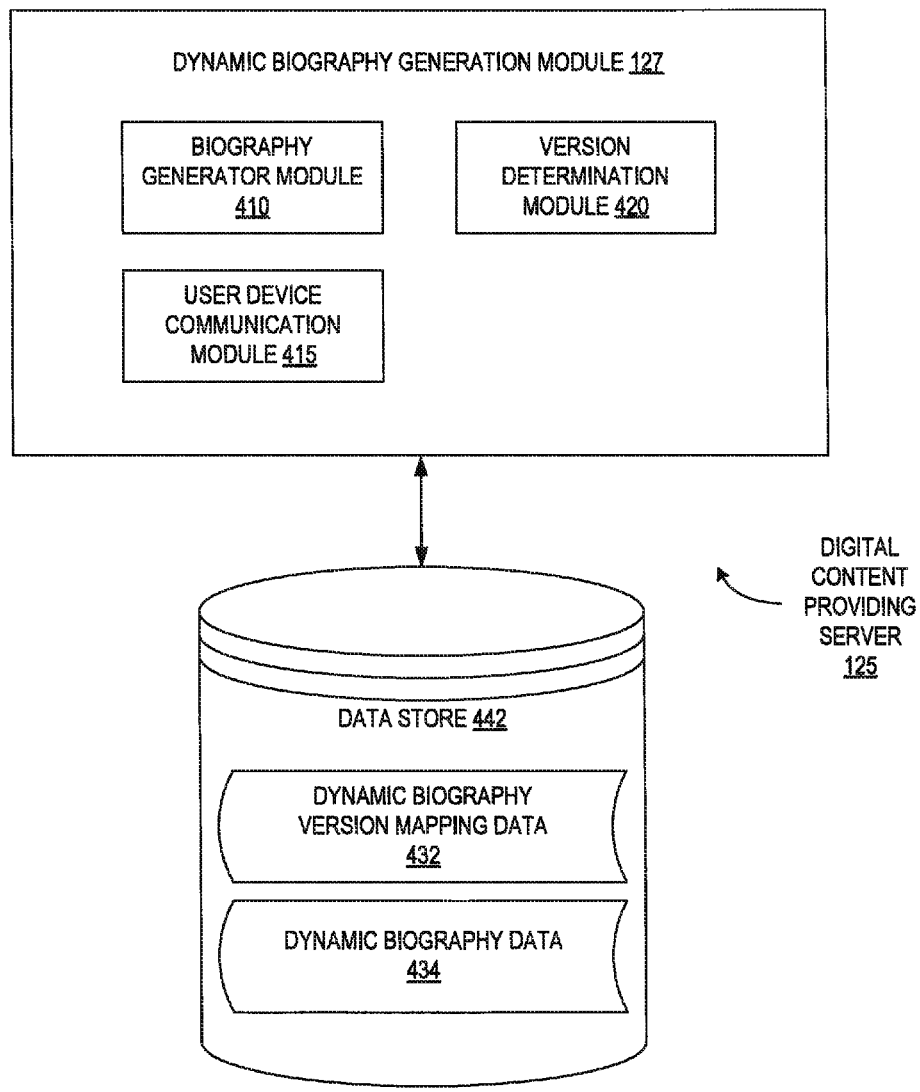
FIG. 4 is a block diagram illustrating a dynamic biography generation module, according to an embodiment.

FIG. 4 is a block diagram of one embodiment of a dynamic biography generation module 127 that is included in a server 125, which may correspond to dynamic biography generation module 127 of FIG. 1. In one embodiment, digital content providing server 125 includes dynamic biography generation module 127, which may include biography generator module 410, user device communication module 415, and version determination module 420. In one embodiment, dynamic biography generation module 127 is connected to a data store 442, which may be a file system, database or other data management layer resident on a data storage device such as a disk drive, RAM, ROM, database, etc.

In one embodiment, biography generator module 410 is responsible for generating the supplemental information associated with an electronic media item. The supplemental information may include for example, a character biography, a plot summary, or some other information. Biography generator module 410 may receive written content that serves as the supplemental information as an input or may automatically generate the supplemental information using, for example, natural language processing techniques. The written content may be provided by human content generators that write different versions of the character biography, plot summary, etc. which correspond to different locations in the narrative. Each version includes information revealed in the narrative from the beginning up to the corresponding location. Biography generator module 410 may also automatically generate supplemental information by scanning a written or audio version of the text and extracting important character or plot details. Biography generator module 410 may use, for example, natural language processing to extract the relevant details and may combine those details into various versions of the supplemental information. In one embodiment, this automatic generation may be done before the electronic media item is made available to the user, however in other embodiments, the automatic generation may be done in real time, as the user is actively consuming the electronic media item.

Biography generator module 410 may store the received or automatically generated supplemental information as dynamic biography data 434 in data store 442. Biography generator module 434 may also store dynamic biography version mapping data 432 in data store 442. Dynamic biography version mapping data 432 may include a relation between different versions of the supplemental information and locations in the associated electronic media item. For example, dynamic biography version mapping data 432 may indicate that version 1 of the dynamic biography data 434 is associated with pages 1-10 of the electronic media item. This dynamic biography version mapping data 432 may be used to identify which version of the dynamic biography data 434 to display to the user.

User device communication module 415 may allow communication between dynamic biography generation module 127 in digital content providing server 125 and user devices 102, 104. User device communication module 415 may communicate with user device 102, 104, for example, over network 106 and wireless communication system 110. In another embodiment, user devices 102, 104 may have a direct wired connection to digital content providing server 125. User device communication module 415 may receive, from user device 104, a request for supplemental information associated with an electronic media item. The request may be received at the time the electronic media item is downloaded from digital content providing server 125, or at a subsequent time. In response to the request, user device communication module 415 may provide dynamic biography data 434 and/or dynamic biography version mapping data 432 to user device 104.

In another embodiment, rather than a request for all of dynamic biography data 434, user device communication module 415 may receive a request for only a particular version of the supplemental information. For example, user device 104 may make a version determination and user device communication module 415 may receive a request for the corresponding version. In another embodiment, user device communication module 415 may receive an indication of a reading location. In this case, version determination module 420 may make a version determination using dynamic biography version mapping data 432. For example, the reading location may indicate that the user has read up to page 100 of an electronic publication. Version determination module 420 may refer to dynamic biography version mapping data 432 to identify a version of the supplemental information that corresponds to page 100 (e.g. version 10). Version determination module 420 may then instruct user device communication module 415 to provide version 10 of the supplemental information from dynamic biography data 434 to the user device 104. User device 104 may make the version determination itself in the same manner when it is provided with dynamic biography version mapping data 432.

Figure 5:
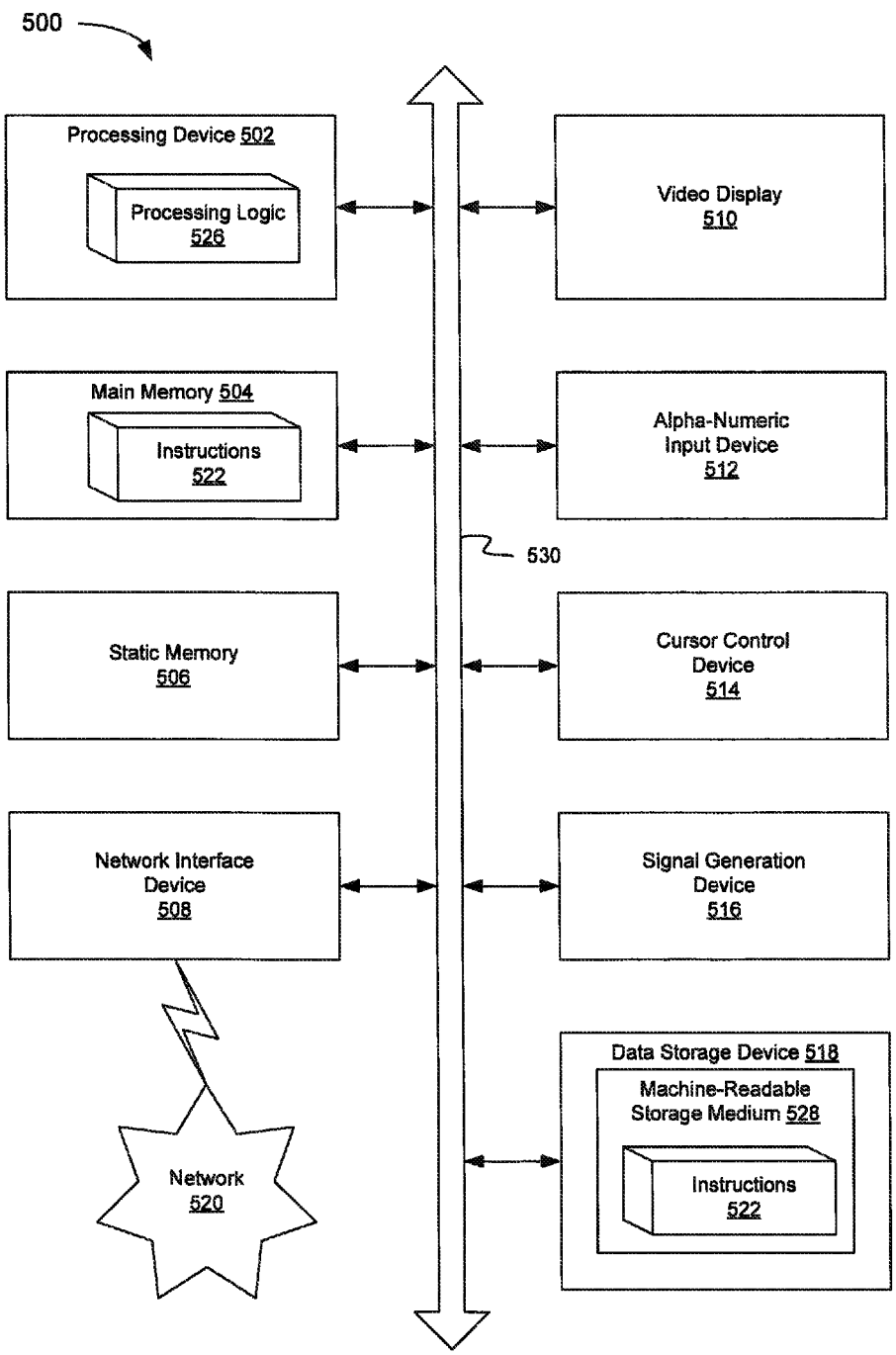
FIG. 5 is a block diagram illustrating one embodiment of a computer system, according to an embodiment.

FIG. 5 illustrates a diagrammatic representation of a machine in the exemplary form of a computer system 500 within which a set of instructions, for causing the machine to perform any one or more of the methodologies discussed herein, may be executed. The system 500 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may represent digital content providing server 125 of FIG. 1.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the popularity prediction module 127 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable medium 528 on which is stored one or more sets of instructions 522 (e.g., instructions of popularity prediction module 127) embodying any one or more of the methodologies or functions described herein. The instructions 522 may also reside, completely or at least partially, within the main memory 504 and/or within processing logic 526 of the processor 502 during execution thereof by the computer system 500, the main memory 504 and the processor 502 also constituting computer-readable media. The instructions may further be transmitted or received over a network 520 via the network interface device 508.

While the computer-readable storage medium 528 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Figure 6:
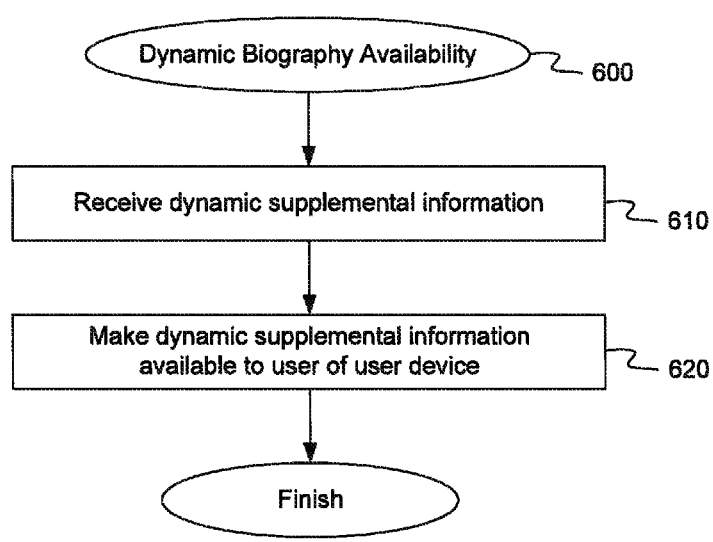
FIG. 6 is a flow diagram illustrating a dynamic biography availability method, according to an embodiment.

FIG. 6 is a flow diagram illustrating a dynamic biography availability method, according to an embodiment of the present invention. The method 600 may be performed by processing logic that comprises hardware (e.g., circuitry, dedicated logic, programmable logic, microcode, etc.), software (e.g., instructions run on a processor to perform hardware simulation), or a combination thereof. The processing logic is configured to dynamically provide supplemental information (e.g., character biography information, plot summary information, etc.) to a user. In one embodiment, method 600 may be performed by dynamic biography module 135, as shown in FIGS. 1 and 2.

Referring to FIG. 6, at block 610, method 600 receives dynamic supplemental information. Dynamic biography module 135 may receive the supplemental information from digital content providing server 125 and may store it as dynamic biography data 234. The supplemental information may be received in response to a request from a user, automatically when the associated electronic media item is downloaded, or in response to some other factor. The received supplemental information may include a one or more specific versions of the supplemental information or all of the supplemental information as well as dynamic biography version mapping data 232.

At block 620, method 600 makes the dynamic supplemental information available to a user of the user device 104. Dynamic biography module 135 may provide one or more versions of the supplemental information to the user in response to a request for the supplemental information. The versions provided may correspond to the user's location in the electronic media item.

Figure 7:
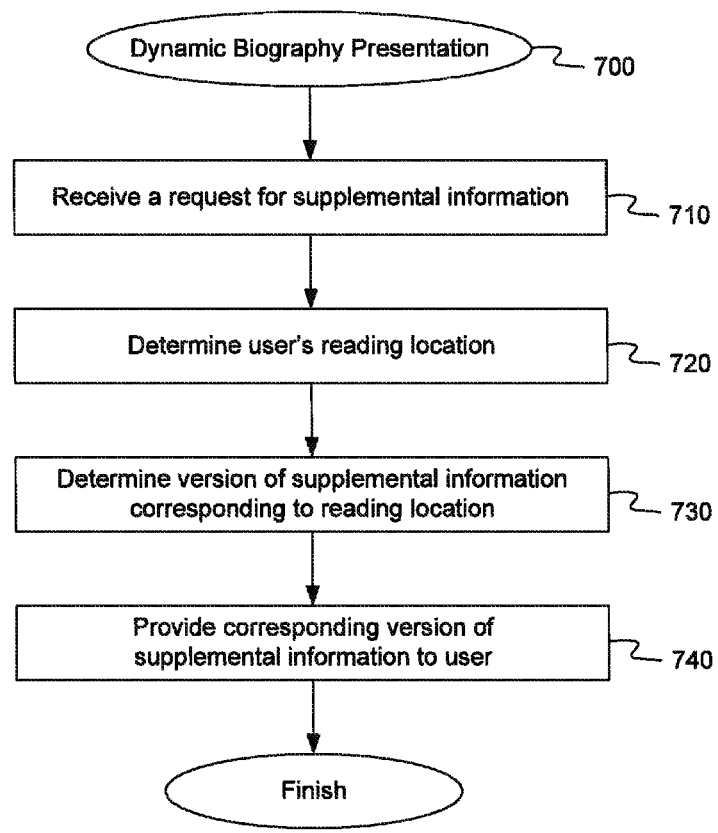
FIG. 7 is a flow diagram illustrating a dynamic biography presentation method, according to another embodiment.

FIG. 7 is a flow diagram illustrating a dynamic biography presentation method, according to an embodiment of the present invention. The method 700 may dynamically provide supplemental information to a user based on the user's reading location in an electronic publication. In one embodiment, method 700 may be performed by dynamic biography module 135, as shown in FIGS. 1 and 2.

Referring to FIG. 7, at block 710, method 700 receives a request for supplemental information. User interface module 225 may receive the request from a user of user device 104 (e.g., through a provided user interface). The request may be received by a user inputting a supplemental information command (e.g., a particular button, menu selection, etc.) In one embodiment, character's names in the electronic publication may contain a hyperlink, whereby the user may select the character's name and a request for a character biography is generated.

At block 720, method 700 determines a user's reading location in the electronic media item in response to the request for supplemental information 710. Reading location tracking module 210 may determine how may measurable units (e.g., pages, chapters, sections, etc.) of the electronic media item the user has consumed and how that location is affected by any changes in electronic media data 240. This location may be stored as the user's actual location in user reading location data 236. For an electronic publication, such as an ebook, magazine, newspaper, etc., the location is a reading location. However, for other types of electronic media items, the location data may correspond to a listening location or viewing location, as appropriate.

At block 730, method 700 determines a version of the supplemental information corresponding to the reading location identified at block 720. Version determination module 220 may take the reading location and compare it to dynamic biography version mapping data 232. Dynamic biography version mapping data 232 includes an indication of which version of dynamic biography data 234 corresponds to different reading locations. For example, if the reading location is indicated as the beginning of chapter 2, version determination module 220 will identify the version of dynamic biography data 234 that contains biography or plot summary information up to the end of chapter 1. This version may be indicated in dynamic biography version mapping data 232 which may include, for example, a list of all versions of the supplemental information and a minimum reading location at which each version may be provided to the user.

At block 740, method 700 provides the corresponding version of the supplemental information to the user. User interface module 225 may display the supplemental information in a user interface on user device 104. The supplemental information may be displayed, for example, in a new window on the display, in a separate portion of the window where the text of the electronic publication is displayed, in a pop-up window on top of the other windows, or in some other fashion. Alternatively, the supplemental information may be displayed on some other device, besides user device 104. For example, the user may view the supplemental information on his mobile phone or personal computer, rather than on his electronic reader or television.

Figure 8:
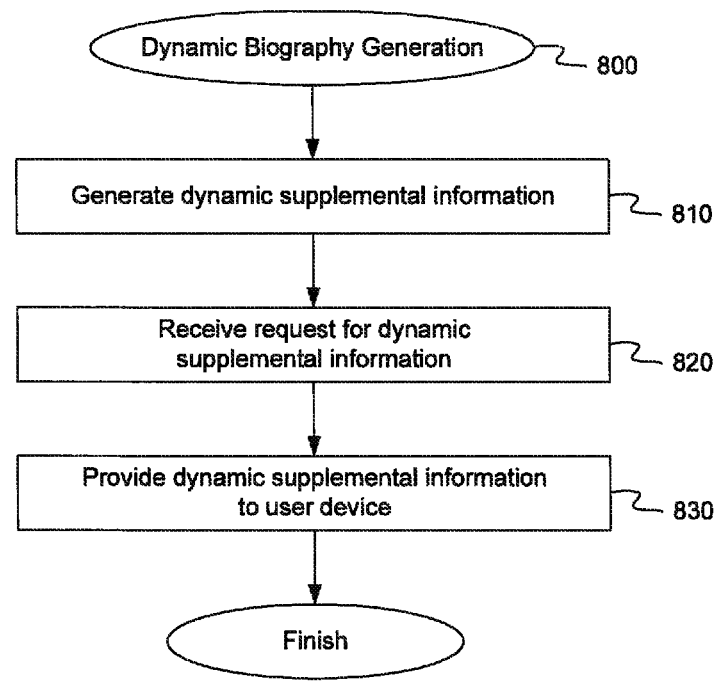
FIG. 8 is a flow diagram illustrating a dynamic biography generation method, according to an embodiment.

FIG. 8 is a flow diagram illustrating a dynamic biography generation method, according to an embodiment of the present invention. The method 800 may generate dynamic supplemental information for an electronic media item and provide it to a user device. In one embodiment, method 800 may be performed by dynamic biography generation module 127, as shown in FIGS. 1 and 4.

Referring to FIG. 8, at block 810, method 800 generates dynamic supplemental information. Biography generator module 410 may receive written content that serves as the supplemental information as an input or may automatically generate the supplemental information using, for example, natural language processing techniques. The supplemental information may include different versions of the character biography, plot summary, etc. which correspond to different locations in the narrative. Each version includes information revealed in the narrative from the beginning up to the corresponding location.

At block 820, method 800 receives a request for the dynamic supplemental information. Dynamic biography generation module 127 may receive the request from a user, automatically when the associated electronic media item is downloaded, or in response to some other factor. For example, in one embodiment, after purchasing an ebook, a user may desire to have the supplemental information. The user may make a request to download the supplemental information from digital content providing server. There may be a fee associated with the supplemental information, however, in some cases it may be provided free of charge.

At block 830, method 800 provides the dynamic supplemental information to the user device or other requestor. User device communication module 415 may provide dynamic biography data 434 and/or dynamic biography version mapping data 432 to user device 104. The supplemental information may include a one or more specific versions of the supplemental information or all of the supplemental information as well as dynamic biography version mapping data 432. The supplemental information on the user device 104 may be used to provide the appropriate versions to the user as needed. If changes occur to the supplemental information, the versions on the user device may be updated periodically, when the user device 104 is connected to digital content providing server 125.

Figure 9:
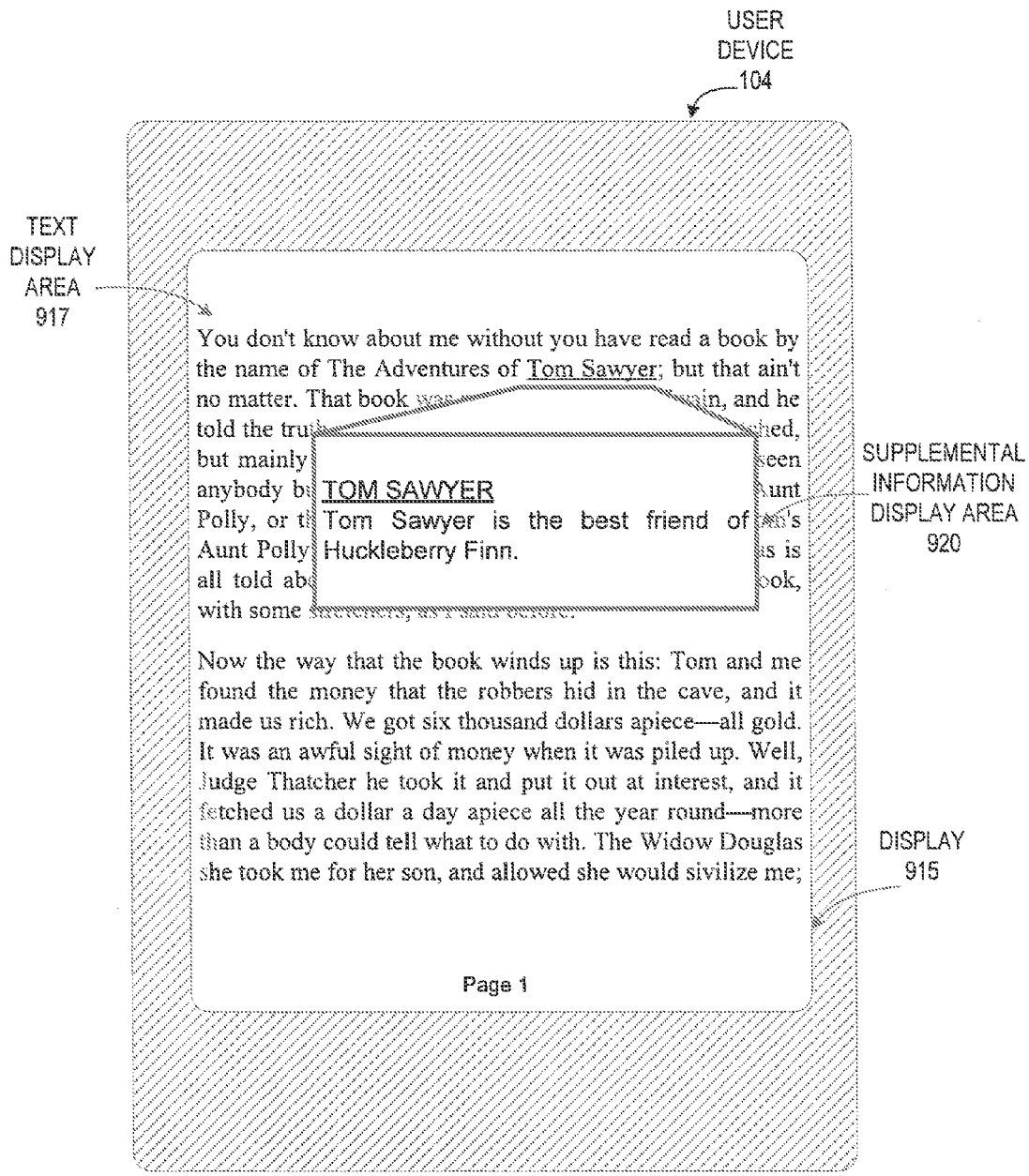
FIG. 9 illustrates a front side of a user device having a display, according to an embodiment.

FIG. 9 illustrates a front side of a user device 104 having a display 915. The user device 104 may be representative of any of the user devices 102, 104 shown in FIG. 1. Display 915 may display content to the user, such as an electronic publication. In one embodiment, a user interface, displayed on display 915 may include a text display area 917 and a supplemental information display area 920 implemented by dynamic biography module 135. In this embodiment, the user interface includes a version of a character biography in supplemental information display area 920. The version of the supplemental information displayed may be dynamically determined according to method 700, as discussed above. In this embodiment, the text display area 917 is currently displaying the first page of the electronic media item. As a result, very little has been learned about the characters to this point, so the supplemental information shown in display area 920 is relatively short. The user interface may be modified, automatically or in response to user input, to show different versions of the supplemental information as the reading location changes. This is merely one example of how the supplemental information may be provided to the user, and one of skill in the art would recognize that there are many other possible alternatives.

Figure 10:
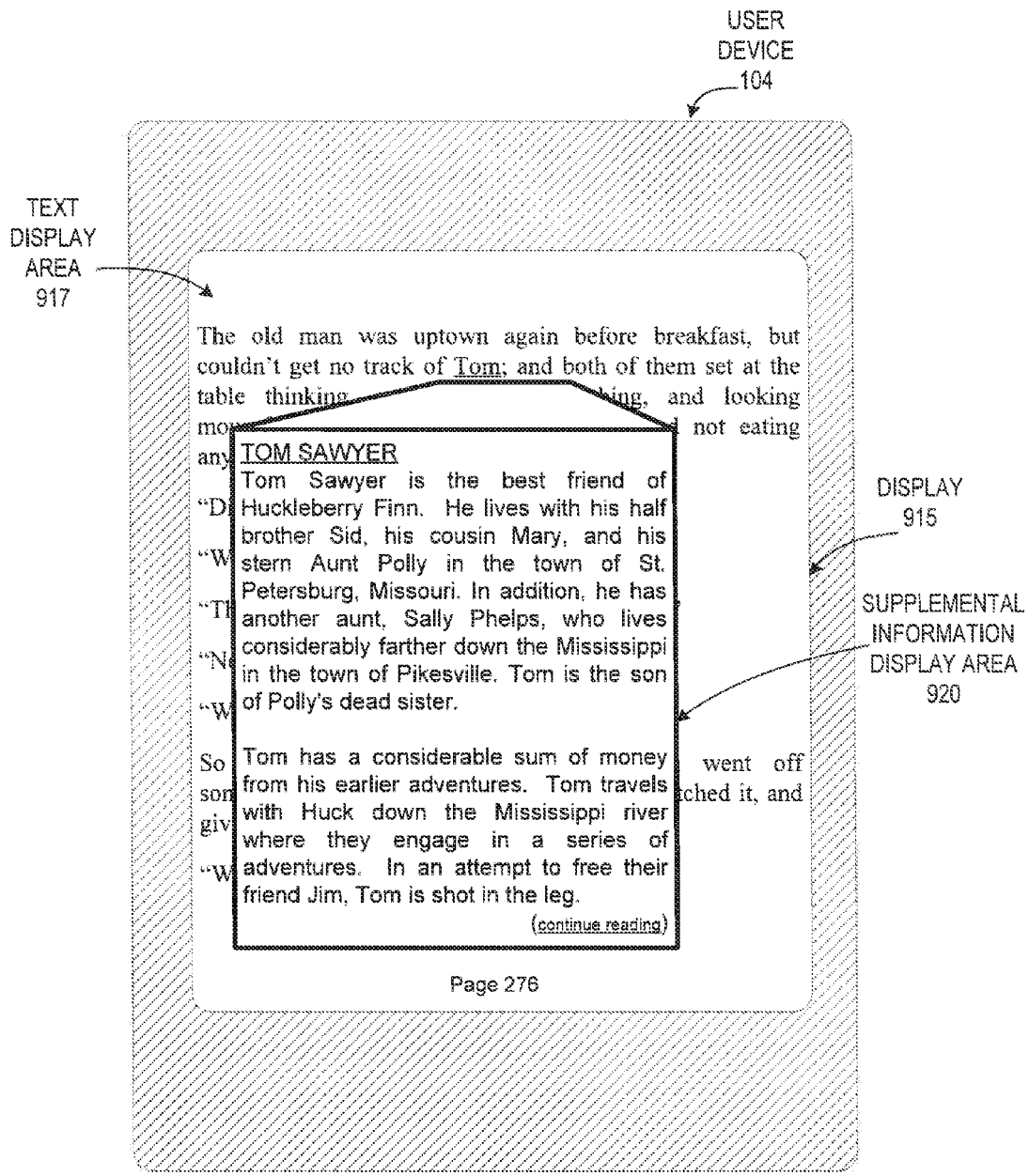
FIG. 10 illustrates a front side of a user device having a display, according to another embodiment.

FIG. 10 illustrates the user device 104 having a display 915. In this embodiment, text display area 917 is showing a page near the end of the electronic media item. As a result, a great deal more information may have been learned about certain characters. In the embodiment of FIG. 10, supplemental information display area 920 shows a different version of the character biography that contains details about the character revealed in the narrative up to the current reading location. Compared to the version displayed in FIG. 9, this version has considerably more information.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving a request for a character biography corresponding to a character portrayed in an electronic media item;
   determining a user's current reading location in the electronic media item;
   determining a furthest point from a beginning of the electronic media item which has been viewed by the user;
   when the furthest point is different from the current reading location, determining, by a processor, a version of the character biography corresponding to the furthest point, wherein the version of the character biography comprises biographical details about the character that have been revealed in a narrative of the electronic media item between the beginning and the furthest point; and
   providing the version of the character biography to the user.

2. The method of claim 1, wherein the request for the character biography is generated in response to a user input command.

3. The method of claim 1, wherein determining the user's current reading location comprises determining a number of measurable units of the electronic media item that the user has consumed.

4. The method of claim 3, wherein determining the version of the character biography comprises identifying, in a dynamic biography version mapping data, a version of the character biography associated with the number of measurable units that the user has consumed.

5. The method of claim 1, wherein providing the corresponding version of the character biography comprises displaying the character biography on a display of a user device on which the user is consuming the electronic media item.

6. The method of claim 1, wherein the character biography is generated by a human content generator.

7. The method of claim 1, wherein the character biography is automatically generated by a digital content providing server using natural language processing techniques.

8. A system, comprising:
   a processor;
   a display device operatively coupled to the processor; and
   a memory operatively coupled to the processor, the memory to store a dynamic biography module to dynamically provide supplemental information associated with a content of an electronic media item, executed from the processor and the memory, the dynamic biography module configured to:
   receive a request for supplemental information corresponding to an electronic media item;
   determine a user's current consumption location in the electronic media item;
   determine a furthest point from a beginning of the electronic media item which has been viewed by the user; and
   when the furthest point is different from the current consumption location, display a version of the supplemental information in conjunction with displaying the content of the electronic media item on the display device, the version of the supplemental information corresponding to the furthest point which has been viewed in the electronic media item.

9. The system of claim 8, wherein the dynamic biography module is further configured to:
   receive a request for supplemental information corresponding to an electronic media item.

10. The system of claim 8, wherein to determine the user's current consumption location, the dynamic biography module is configured to determine a number of measurable units of the electronic media item that the user has consumed.

11. The system of claim 10, wherein the dynamic biography module is further configured to:
    determine the version of the supplemental information corresponding to the current consumption location.

12. The system of claim 11, wherein to determine the version of the supplemental information, the dynamic character biography module is configured to identify, in a dynamic biography version mapping data, a version of the supplemental information associated with the number of measurable units that the user has consumed.

13. The system of claim 8, wherein each version of the supplemental information comprises details revealed in a narrative of the electronic media item between the beginning and a corresponding location in the electronic media item.

14. The system of claim 8, wherein the supplemental information comprises a character biography.

15. The system of claim 8, wherein the supplemental information comprises a plot summary.

16. A method comprising:
- generating a plurality of versions of supplemental information corresponding to a content of an electronic media item, each version corresponding to a different location in the content;
- receiving a request for the supplemental information and an indication of a current consumption location and of a furthest point from a beginning of the electronic media item which has been consumed; and
- when the furthest point is different from the current consumption location, providing, by a processor, one or more versions of the supplemental information corresponding to the furthest point to a requestor.

17. The method of claim 16, wherein generating the supplemental information comprises receiving the supplemental information from a human content generator.

18. The method of claim 16, wherein generating the supplemental information comprises automatically generating the supplemental information from a content of an electronic media item using natural language processing techniques.

19. The method of claim 16, wherein each version of the supplemental information comprises details revealed in a narrative of the electronic media item between the beginning and a corresponding location in the electronic media item.

20. The method of claim 16, wherein providing the supplemental information comprises displaying the supplemental information on a display of a user device on which the user is consuming an associated electronic media item.

* * * * *